United States Patent [19]

Takashima

[11] Patent Number: 4,614,342
[45] Date of Patent: Sep. 30, 1986

[54] ELECTRONIC GAME MACHINE SUITABLE FOR CHANCE AND GAMBLING CARD GAMES

[75] Inventor: Yoshiyuki Takashima, Ishikawa, Japan

[73] Assignees: Doyle Davis, Las Vegas, Nev.; Nanao Corporation, Ishikawa, Japan

[21] Appl. No.: 668,903

[22] Filed: Nov. 7, 1984

[30] Foreign Application Priority Data

Apr. 19, 1984 [JP] Japan .................................. 59-79596

[51] Int. Cl.⁴ .............................................. A63F 1/00
[52] U.S. Cl. ............................. 273/85 CP; 273/85 G; 273/DIG. 28; 273/138 A
[58] Field of Search ............ 273/85 CP, 85 G, 138 A, 273/DIG. 28, 1 E, 1 GC

[56] References Cited

U.S. PATENT DOCUMENTS

| | | | |
|---|---|---|---|
| 2,023,210 | 12/1935 | Potter | 273/85 CP |
| 3,796,433 | 3/1974 | Fraley et al. | 273/85 CP |
| 3,889,956 | 6/1975 | Castle | 273/85 CP |
| 4,156,928 | 5/1979 | Inose et al. | 273/85 CP |
| 4,333,152 | 6/1982 | Best | 273/1 GC |
| 4,494,197 | 1/1985 | Troy et al. | 273/138 A |

FOREIGN PATENT DOCUMENTS 2067080 7/1981 United Kingdom ........... 273/85 CP

Primary Examiner—William H. Grieb
Assistant Examiner—MaryAnn Stoll Lastova
Attorney, Agent, or Firm—Birch, Stewart, Kolasch and Birch

[57] ABSTRACT

An electronic game machine having a single dealer machine for dominating a game procedure and a plurality of player machines responsive to the single dealer machine for playing the game procedure in conjunction with the single dealer machine. The single dealer machine includes a first data processing unit, a first memory, a first panel display, and a first power source. Each of the plurality of player machines includes a second data processing unit, a second memory, a second panel display, a second power source, a manual control unit, and a coin handling unit. The game procedure is shared by the first data processing unit and each of the plurality of second data processing units so that a game may be played between a single player unit and the dealer machine or any number of player units and the dealer machine.

16 Claims, 7 Drawing Figures

ELECTRONIC GAME MACHINE SUITABLE FOR CHANCE AND GAMBLING CARD GAMES

BACKGROUND OF THE INVENTION

The present invention relates to a game machine and, more particularly, to an electronic game machine suitable for a gambling game played with cards.

Recent development of computer technology reaches a range of electronically playing a card game such as the blackjack or twenty-one. Then, it is desired to provide a novel electronic game machine suitable for such a card game.

SUMMARY OF THE INVENTION

Accordingly, it is an object of the present invention to provide a novel electronic game machine suitable for a card game.

It is another object of the present invention to provide a novel game machine having a flexibility of changing the number of playing members.

It is a further object of the present invention to provide a novel game machine for directing and showing the combination between a dealer machine and each of the player machines.

It is a still further object of the present invention to provide a novel game machine for storing hysteresis data regarding each player machine.

It is a yet further object of the present invention to provide a novel game machine for smoothly summing game data.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic game machine comprises a single dealer device for dominating a game procedure and a plurality of player units responsive to the single dealer device for playing the game procedure in conjunction with the single dealer device. The single dealer device includes a first data processing unit, a first memory, a first panel display, and a first power source. Each of the plurality of player units includes a second data processing unit, a second memory, a second panel display, a second power source, a manual control unit, and a coin handling unit. The game procedure is shared by the first data processing unit and each second data processing unit.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

A card game such as blackjack or twenty-one aims to acquire a total card value as near as possible to a given figure without exceeding it. Such a card game is played by a single dealer and a plurality of players. To electronically play the game, a single dealer machine and a plurality of player machines are provided, and the cards are displayed on a display screen such as a cathode ray tube (CRT). Since the number of the player machines playing the game may change, a game machine system must comply with the increase and decrease of the player machine number. As the dealer machine may play the game with every player machine man to man, the other player machines should be informed whose machine is playing the game with the dealer machine. When a plurality of player machines play, hysteresis game data regarding the game per player machine should be stored. Further, the game machine system should sum the game data to calculate and pay a bet when gambling.

Figure 1:
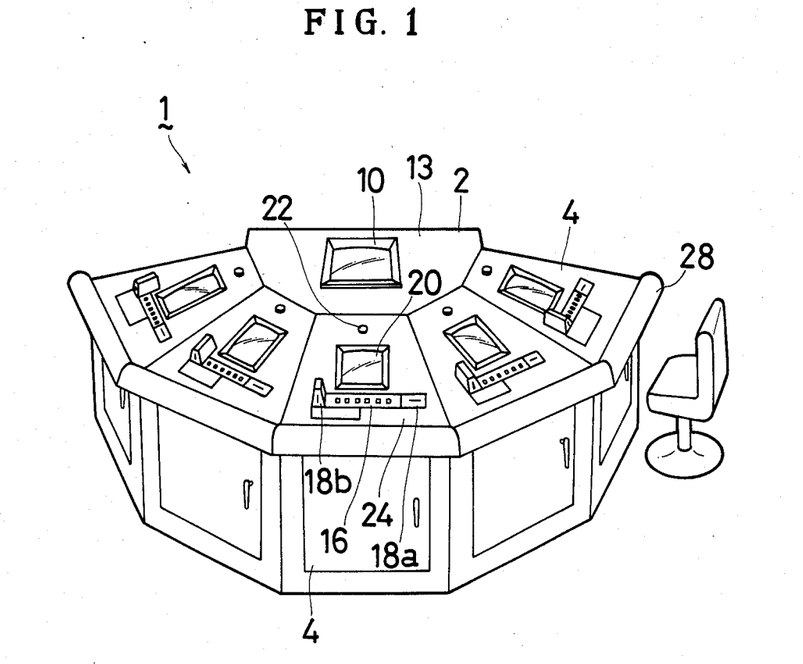
FIG. 1 is a perspective view of an electronic game machine system according to the present invention.
Figure 2:
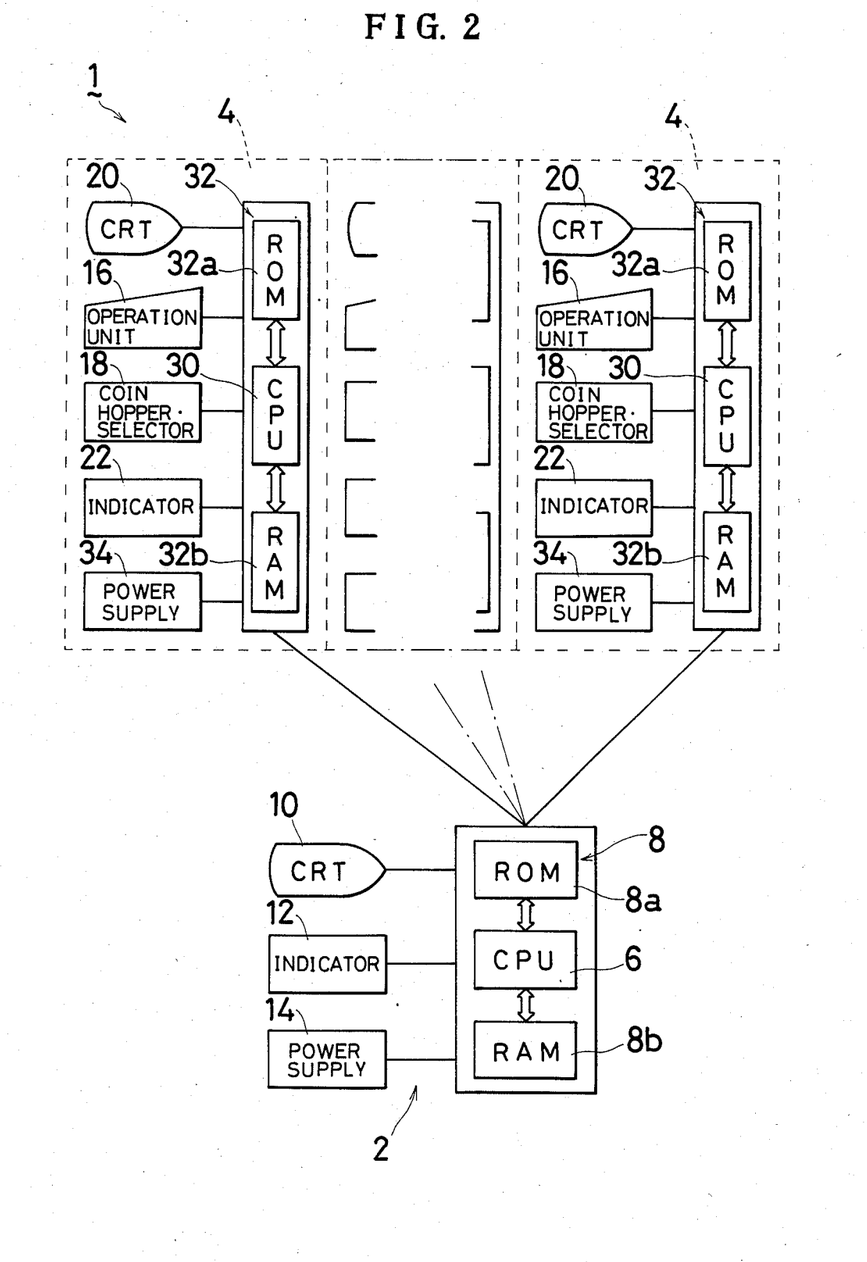
FIG. 2 is a block diagram of a circuit in the electronic game machine system.

FIG. 1 is a perspective view of an electronic game machine system according to the present invention. FIG. 2 is a block diagram of a circuit in the electronic game machine system. The game to be played in to electronic game machine is assumed to be the blackjack played in the gambling houses.

An electronic gambling machine system 1 comprises a single dealer machine 2 and a plurality of player machines 4 which are radiately positioned. In FIG. 1, five player machines 4 are provided. A circuit of the dealer machine 2 comprises a dealer data processor 6 (CPU) for controlling the total game and dealing the cards, and a dealer memory 8 for storing game information. The dealer memory 8 comprises a program memory 8a (ROM) for preliminarily storing game standard steps, random number calculation data used to shuffle and deal the cards, and card character data, and a work memory 8b (RAM) for storing game information processed by the dealer data processor 6 and forwarded from the plurality of player machines 4.

There are further provided in the dealer machine 2, a dealer display 10 such as a CRT monitor for displaying the game information, an indicator 12 including a first display lamp actuated by the player to inform the operator of the occurrence of some trouble that a bet or coin is out of hand or some malfunction of the machine happens to generate, and a dealer power source 14 exclusive to the dealer machine. The dealer display 10 is mounted on an upper panel 13, and the indicator 12 is mounted on a rear panel (not shown). The indicator 12 includes a plurality of second display lamps and first to third coin counters in addition to the first display lamp. Each of the second display lamps is displayed by the control of every player machine to indicate that few coins remain in a coin hopper used for paying out coins or to indicate that some trouble occurred in the coin hopper. The first coin counter is operated to sum the coins as thrown into the coin hopper of each of the player machines and display the result. The second coin counter is operated to sum the coins as thrown into a coin box after the coins in the coin hopper of each of the player machines exceed a predetermined number, and to display the result. The third coin counter is operated to sum the coins paid from the coin hopper of each of the player machines and display the result. A battery unit is provided for serving as a backup for the dealer memory 8, so that the contents of the dealer memory 8 are not lost even by power failure.

Each of the plurality of player machines 4 has the same construction so that they are compatible with one another. The single dealer machine 2 is coupled with the plurality of player machines 4 in the so-called pooling selecting system, so that each of the player machines 4 responds to the call from the dealer machine 2 which dominates the interface control. The game data and commands are synchronously transferred because of the hand shake system between the dealer machine 2 and the player machines 4.

Figure 3:
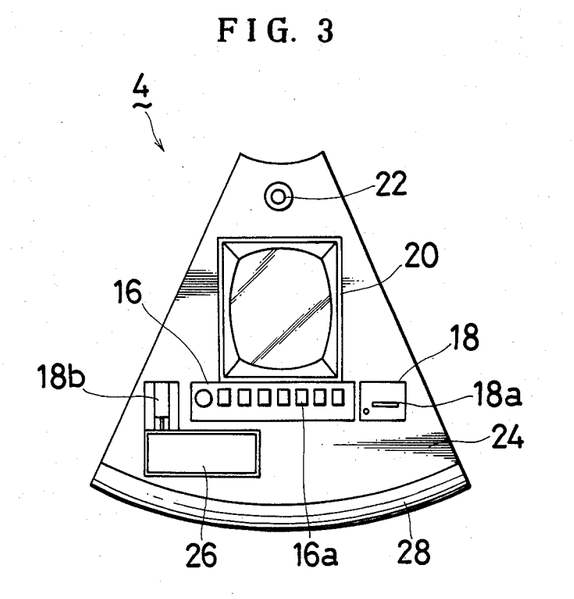
FIG. 3 is a plane view of a player machine in the game machine system.

Each of the plurality of player machines 4 comprises an operation unit 16 for inputting the game information, a coin hopper and selector 18 for storing and paying out the coins, a player display 20 such as a CRT monitor for displaying the game information, and an indicator 22 for directing the game procedures. The operation unit 16, the player display 20, and the indicator 22 are disposed on an operation panel 24 as shown in FIG. 3. With reference to FIG. 3, the operation unit 16 contains a plurality of key switches 16a such as a "BET" key and a "PAY OUT" key, each being operated to input the game information. The coin hopper and selector 18 includes a coin hopper for storing the coins and paying out the directed number of the coins, a coin selector for detecting whether the entered coins are just, (both not shown), a coin inlet 18a, and a coin outlet 18b.

Each of the coin inlet 18a and the coin outlet 18b is positioned at each of the right and the left of the key switches 16a on the operation panel 24. The coin hopper is provided with a coin lift up mechanism for lifting the coins upward. Adjacent the coin outlet 18b coupled with the coin lift up mechanism, a coin sensor is provided for sensing and counting the number of the coins actually paid out of the player machine 4. A coin pool dish 26 is provided on the operation panel 24 for receiving and pooling the coins exhausted through the coin outlet 18b. Preferably, the player display 20 mounted on the operation panel 24 is somewhat tilted to become easy to watch. An arm rest 28 is provided at the edge of this side of the operation panel 24 for an arm rest and, further, a coin stopper.

Further, each of the player machines 4 includes a player data processor 30 (CPU) for processing the game information from the dealer machine 2 and the operation unit 16 so as to detect the result and control a refund or pay out of the coins, a player memory 32 for storing the game information, a player power source 34 exclusive to the player machine 4. The player memory 32 includes a program memory 32a (ROM) for preliminarily storing a player control program, a result detection program, character data, and a work memory 32b (RAM) for storing the game information processed by the player data processor 30 and forwarded by the dealer machine 2. A battery unit is provided for serving as a backup for the player machine 4 so that the contents of the player memory 32 are not lost in the event of power failure. A connector means is provided for coupling the dealer machine 2 and the lurality of player machines 4. A rotary switch is provided in each of the player machines 4, which is operated for selecting the game order between the player machines 4.

Figure 4A:
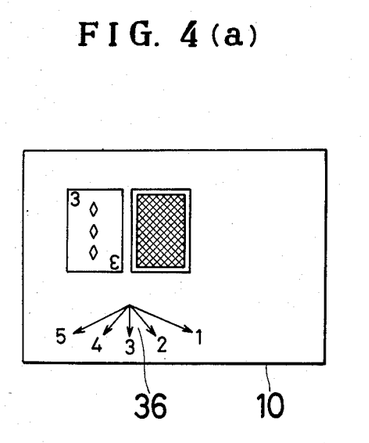
FIGS. 4(a) and 4(b) are display examples in a dealer machine display and a player machine display, respectively.
Figure 4B:
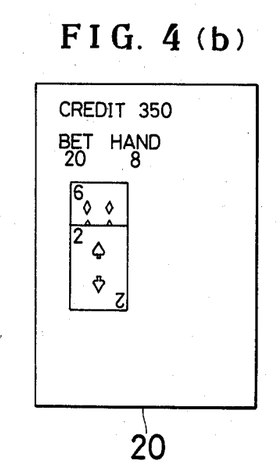

The above-described arrangement enables the following game operations. To start the game, some coins, e.g., one-dollar coins are entered through the coin inlet 18a of at least one of the player machines 4, so that the coin selector of the coin hopper and selector 18 is operated to count the number of the coins. The coin number data are forwarded to the player data processor 30. The player data processor 30 permits the work memory 32b to store the coin number data as a credit while the processor 30 permits the player display 20 to display the credit with the display of "CREDIT" at the top thereof as shown in FIG. 4(b), so that the data are forwarded to the dealer machine 2. The dealer data processor 6 is responsive to the coin number data developed by the respective player machines 4 for permitting the work memory 8b to store the whole of the coin number data and outputting it to the coin counter on the rear panel of the dealer machine 2.

To do betting, the "BET" key in the operation unit 16 is actuated by the amount of betting, so that the betting information is inputted into the player data processor 30. Each time the processor 30 inputs the information from the operation unit 16, it permits the work memory 32b to store the information as a bet. As shown in FIG. 4(b), every player display 20 is caused to display the bet with the display of "BET" at the top thereof. The bet is subtracted from the credit by the data processor 30, so that the work memory 32b is caused to store the result. The player display 20 is caused to display the result at the "CREDIT" display portion at the top thereof.

Once the "BET" keys of the respective player machines 4 have been operated, the dealer data processor 6 of the dealer machine 2 reads out the card data from the program memory 8a to subsequently output data from the dealer machine 2 and the respective player machines 4. The dealer data processor 6 repeats this operation twice. Accordingly, the card data corresponding to two cards are dealt to the dealer machine 2 and the respective player machines 4. Each time the dealer data processor 6 inputs the card data to the respective player data processors 30, the processors 30 permit the work memory 32b to store the card data and output the data to the player displays 20. The respective player displays 20 display two cards face up at the left half thereof as shown in FIG. 1(b).

Before every player display 20 displays the two cards, the cards to be displayed in every player display 20 appear in the top right half of the dealer display 10, shift, and, finally, disappear to the bottom. In this case, these cards shifted and displayed in the dealer display 10 may be faced down. In the dealer display 10, e.g., the left bottom, as shown in FIG. 4(a), a player machine display 36 is shown which comprises the combinations of arrows and player machine figures. The arrows are selectively and subsequently flickered to indicate by the related figure which player machine 4 receives the shifted card in the right half of the dealer display 10. The dealer data processor 6 operates to flicker the arrows in accordance with the program as stored in the program 8a.

The dealer data processor 6 outputs the first card data from the two cards stored in the work memory 8b into the dealer display 10 and the character data representative of the rear of the second card from the program memory 8a into the dealer display 10. Therefore, the dealer display 10 is caused to display the first card face up and the second card face down as shown in FIG. 4(a). The two cards in the dealer machine 2 are displayed one by one each time the dealer data processor 6 reads out the card data from the memories 8b and 8a.

When the dealer display 10 and the respective player displays 20 display the two cards, the dealer data processor 6 is operated to detect whether the first card 5 displayed in the dealer display 10 is an ace. If so, the dealer data processor 6 forwards this information to the respective player machines 4. Therefore, the respective player machines 4 are responsive to the instruction of the respective player data processors 30 for flickering a lamp stored in an "INSURANCE" key of the key switches 16a. Thus, the dealer machine 2 provides a declaration of "INSURANCE". During this condition, the respective player machines 4 can place an "INSURANCE" bet, for which the respective "INSURANCE" keys are depressed. When the "INSURANCE" keys are depressed, the flickered lamps remain illuminated. The "BET" key of the key switches 16a is repeatedly depressed by the amount of the bet, so that the work memories 32b of the player machines 4 are operated to store both the amount of the "INSURANCE" bets and also stores the amount determined by subtracting the "INSURANCE" bet amount from the "CREDIT" amount. At a portion, e.g., the lower portion of every player display 20, the "INSURANCE" amount is displayed together with the display of "INSURANCE", and the subtracted amount is displayed at the "CREDIT" display portion. It may be possible that the depression of the "BET" key is replaced by depressing the "INSURANCE" key to place the "INSURANCE" bet.

After a predetermined time has elapsed, the dealer data processor 6 closes the time of betting the "INSURANCE" bet. When the "INSURANCE" bet time has been closed, settlement is made according to the prescribed rule. At this time, if the dealer machine 2 has the cards of exactly 21 totally to be "blackjack", the game ends. Otherwise, the game is advanced to the next step, or the "DRAW". If the dealer's first card is not an ace, the "DRAW" step is immediately selected. However, if one of the player machines 4 has a "blackjack", the game of this player ends to thereby settle the bets.

In the "DRAW" step, the dealer data processor 6 is responsive to the standard steps in the program memory 8a for providing a control signal to the player data processor 30, which draws first, to instruct to proceed the game. The player data processor 30 selected is responsive to the control signal for outputting an order selection signal to the indicator 22, thereby illuminating the indicator 22 to select the player machine 4 which is playing. As the dealer data processor 6 outputs the control signal to the dealer display 10 at the same time, a selected arrow in the player serial number display 36 of FIG. 4(a) is flickered. Then, every player selects either a "STAND" key or a "HIT" key to depress in his key switches 16a in order to select a "STAND" or "HIT", respectively. Play information from the operation unit 16 is transferred to the dealer data processor 6 via the player data processor 30.

Each time the dealer data processor 6 inputs the "STAND" data from every player machine 4, the processor 6 responds to the data, so that it outputs the control signal to the dealer display 10 and the next player machine 4 instructing to proceed with the game. Therefore, the arrow in the player serial number display 36 which is flickered is displayed in the dealer display 10 in the order of the player to play, and also in every indicator 22 of every player machine 4.

When the dealer data processor 6 inputs the "HIT" data from one of the player machines 4, the processor 6 is responsive to the data, so that it reads out card data from the program memory 8a and forwards the data to the player data processor 30 of the one of the player machines 4. The player data processor 30 causes the work memory 32b to store the card data and the player display 20 to receive the data. Here, the player display 20 displays the subsequently dealt card on the previously dealt card with the cards partially overlapping, the subsequently dealt card being dealt each time the "HIT" data are inputted. The player data processor 30 causes the player display 20 to display the sum of the dealt cards under the display of "HAND" as shown in FIG. 4(b) as the processor 30 calculates the sum. The players can see the displayed sum so as not to exceed the desired total "21", so that they can select to "stand" on their cards or ask for more by saying "hit me". When the player goes over "21" (busts), the player data processor 30 detects the condition, so that it forwards "stand" information as the "bust" information to the dealer machine 2.

At the same time, the player data processor 30 reads out the "BET" amount from the work memory 32b of the player machine 4, so that it starts to settle the bets, immediately. After all the players have ended their drawings and a predetermined time has passed, the dealer data processor 6 reads out the second card data from the work memory 8b and outputs the data to the dealer display 10. Then, the face-down card as shown in FIG. 4(a) is turned face up in the dealer display 10. Thus, the dealer display 10 displays the two cards face up. When the dealer machine 2 has "blackjack", the dealer data processor 6 outputs "blackjack" information to the respective player data processors 30, so that the respective data processors 30 start to settle the bets. When the two cards of the dealer machine 2 do not form "blackjack" and the sum of these cards does not exceed a selected value "17", the dealer data processor 6 subsequently reads out the card data from the program memory 8a, whereby the card data are stored in the work memory 8b and the dealer display 10 displays the cards face up and partially overlapping each other. When the sum of the card data stored in the work memory 8b exceeds the value "17", the dealer data processor 6 stops reading out the card data from the program memory 8a, so that it transfers the sum data to the respective player machines 4. Responsive to the sum data from the dealer machine 2, the respective player data processors 30 start to settle the bets. The settlement is to end the present game.

If the player machine 2 receives the first two cards of a pair, the machine 2 can select a split pair to divide the two cards into different twin hands. The player data processor 30 detects whether the first two cards are a pair, and causes a lamp in a "SPLIT" key of the key switches 16a to be flickered. When the player depresses this key, the first two cards displayed in the player display 20 are displayed at the left side and the right side of the player display 20 as being displayed as the twin hands. Thereafter, each card is dealt to each of the twin hands. The amount of his bet to the original hand is automatically placed to both twin hands without changing the value. Further, the player can select a "DOUBLE DOWN" if he receives his cards and feels that he is favorable, to double his original bet. For this purpose, responsive to the player data processor 30, a lamp induced within a "DOUBLE" key in the key switches 16a is flickered for a certain length of time. During this time, the key is depressed and the "BET" key is repeatedly operated a specified number of times. Instead of operating the "BET" key, the "DOUBLE" key may be operated to increase his bet. After the "DOUBLE DOWN" is selected, the player can draw only one card, and the card is once displayed in the player display 20 face down and after that automatically turned face up. When the "SPLIT PAIR" or the "DOUBLE DOWN" is selected, the player display 20 displays a condition of "SPLIT" or "DOUBLE" at its upper portion and the bet. If the "SPLIT PAIR" is selected, the second display of "HAND" is displayed together with the sum of the second hand.

Responsive to the play information from the operation unit 16 and the information from the dealer data processor 6, the player data processor 30 in every player machine 4 reads out the credit and the bet from the work memory 32b to settle. The settled bet results are stored in the work memory 32b each time. A "PAY OUT" key in every key switches 16a is operated to finally pay out the game result. For this purpose, every player data processor 30 reads out the credit and the bet from every work memory 32b to settle all the amounts by additions and subtraction. Every player data processor 30 rotates the motor in the coin lift up mechanism of the coin hopper and selector 18 to lift up the coins in the coin hopper.

Therefore, the coins are passed through the coin sensors and paid out through the coin outlet 18b. The coin sensor is operated to count the number of the passing coins to provide the counted value to the player data processor 30. The player data processor 30 detects whether the previously settled amount coincides with the counted value sensed by the coin sensor. When the coincidence is detected, the player data processor 30 stops the rotation of the motor of the coin hopper and selector 18. Therefore, the paying out has ended.

The total coin number paid out by the respective player machines 4 is calculated by the dealer data processor 6 on the basis of the information from the respective player data processors 30, so that the dealer data processor 6 outputs the total coin number to the coin counter at the rear panel of the dealer machine 2. When there are few coins in the coin hopper of every player machine 4 or some trouble in the operation of the coin hopper, the dealer data processor 6 is responsive to the information from every player data processor 30 for switching the display lamp at the rear panel of the dealer machine 2. After the coins in the coin hopper of every player machine exceed a certain number, the coins thrown thereafter are stored in the coin box. The coin counter in the rear panel of the dealer machine 2 displays the total coin number in the coin box of every player machine 4. For one player to call the operator, a "SERVICE" or "CHANGE" key of the key switches 16a of every player machine 4 is operated to switch the relevant display lamp on the rear panel of the dealer machine 2.

In settling, every player display 20 displays "WIN" at a portion, e.g., low portion when the player won against the dealer, "LOST" when the player has lost, and "PUSH" when the game ended in a draw. In case the payer won and the game was in a draw, some amount is added to the credit, so that the added amount is displayed together with the display of "WIN" or "PUSH". Then, the added amount is transferred to the "CREDIT" display portion of each player display 20 by a certain amount, e.g., one dollar for additions. When the player lost, he busted so that he must pay the dealer his bet, in which the display of "LOST" only is enabled without any amount display. Thus, the displays of "WIN", "PUSH", and "LOST" together with these amounts, namely, the displays of "ODDS" are displayed in each settlement except the settlement of the "INSURANCE" bet.

Every player machine 4 includes a switch acutuated for reviving every hysteresis data. Once this switch is depressed one time every player display 20 displays the last game. If this switch is depressed once more, the player display 20 displays the second to last game. This can prevent any player from doubting the game results.

Although the above description is directed to the game machine system playing blackjack, it is evident that any other card games and any other games can be played by the game machine of the present invention so long as the dealer and a plurality of players play the game. In place of the coins, any medals can be used in the present game machine system. Instead of the combinations of the arrows and the player machine figures in the player machine display 36 to be displayed in the dealer display 10, it may be possible that the player machine figures only are provided as being flickered or only one figure of any player presently playing the game is displayed or the like. Instead of providing the single lamp in the indicator 22 of every player machine 4, it may be possible that a plurality of lamps may be aligned, in which they are arranged in an arrow shape, or the single lamp is flickered. To induce the selection of the key switches such as the "INSURANCE" and the "SPLIT PAIR", instead of flickering the related lamp in the key switches 16a, it may be possible that the related lamp may be provided as being separated from the key switches 16a or a voice synthesizer may be provided in place of flickering the lamp to induce the selection. A voice synthesizer may be provided for generating voice information representative of the bet and the sum of the cards data etc. as displayed in every player display 30. Any effective sound may be inserted in certain stages of the game to enhance the effect of playing the game. Every player display 20 may have a display for calling every player and introducing new coins when his credit becomes smaller than a predetermined amount. A display lamp or voice synthesizer may be provided for calling every player to introduce new coins.

As described above, in accordance with the present invention, since every machine has the same construction to be compatible with one another, it is flexible to increase and decrease the number of the player machines. As the dealer machine and every player machine have the individual data processor, memory, and power source, any one of the player machines can be separated from the game machine system when it is damaged. The game hysteresis data can be reserved in every machine. It becomes easy to connect and separate the dealer machine and every player machine. All the features of the present invention have been long desired.

For reference, the summary of blackjack is as follows.
(1) Gaming persons: A single dealer and one or more players are necessary.
(2) Dealing of the Cards: First the dealer gives each player, prior to himself, first card face up, clockwise. Second card is dealt to each player face up and the dealer face down.

(3) Bet: A bet is within one dollar at lowest and twenty dollars at largest.
(4) Card Counting: An ace counts 1 or 11 at the option of the holder, picture face cards count "10" each and all others take their pip or number value.
(5) Player's Target: Every player tries to acquire cards which count exactly 21 or to stop below it closer than does the dealer. If seven cards drawn do not exceed 21, the player wins the dealer having cards of 21. If three cards of "7" are drawn, the player wins the dealer having cards of 21.
(6) Blackjack: If the dealer's or a player's first two cards are an ace and "10" card, he has a "blackjack". If a player has a "blackjack" and the dealer does not have, the player wins 1.5 times his bet. If a player does not have "blackjack" and the dealer has, the player loses his bet. If a player and the dealer have a "blackjack", the game ends in a draw, so that the bet remains left.
(7) Card Deal: Cards are always dealt in turn clockwise beginning at the dealer's left. A player may "stand" on his cards or ask for more by saying "hit me". Additional cards are then dealt to him face up one at a time in response to the hit request until he goes over 21 (busts). After all the players have drawn the cards, the dealer turns his card face up. The dealer continues to draw the cards by 17 or more. When the cards count 17 or more, the dealer stands immediately. In case the dealer has an ace, so that the ace counts 11 and the dealer hand is from 17 inclusive to 21, the dealer stands with the ace of 11. That is, the dealer draws a card with his cards of 16 or less and stands with 17 or more.
(8) Settlement: If a player busts, he loses it even if the dealer busts thereafter. If a player does not bust and the dealer busts, the player wins double his bet. If none of them busts, either of the dealer and a player who has a higher count wins double his bet. When the dealer and a player have the same count below 21, a push or draw of the game is detected, so that their bets remains left.
(9) Split Pair: If a player's first two cards are a pair, he may duplicate the amount of his bet and play both as separate hands. Automatically, the player gets one card for each of the split cards. Thereafter, each of the cards is regarded as the normal hand. If a player splits a pair of aces, he receives a single card to each of the aces. Even if one of the picture face cards or "10" card is dealt to the split ace, the count is not regarded as the "blackjack" but as the normal "21". Once the cards are split, no further split is permitted even if the same count card is dealt to the split card.
(10) Double Down: After a player sees his card, he can increase his bet up to its double. He is permitted to draw a single card only. If a player has split his cards, he cannot double down both pairs.
(11) Insurance: When the dealer's first card is an ace, a player can place a different bet of half or less than his original bet prior to the draw of the dealer. In such a case, when the dealer has a "blackjack", the player receives double his different bet. At the same time, he gets the "insurance" bet as a different bet. Unless the dealer has a "blackjack", the player loses his different bet. The game is advanced without any change. The original bet is regarded as being independent on the different bet.
(12) Shuffle: The shuffle is conducted between the plays on the following conditions. No shuffle is carried out during a game. No shuffle is possible according to a player's request.

| The number of decks to be used | condition |
| --- | --- |
| 1 deck | each time a play has ended |
| 2 decks | when a play has ended and the cards are left below one deck |
| 3 decks | when a play has ended and the cards are left below one deck |
| 4 decks | when a play has ended and the cards are left below one deck |

Figure 5A:
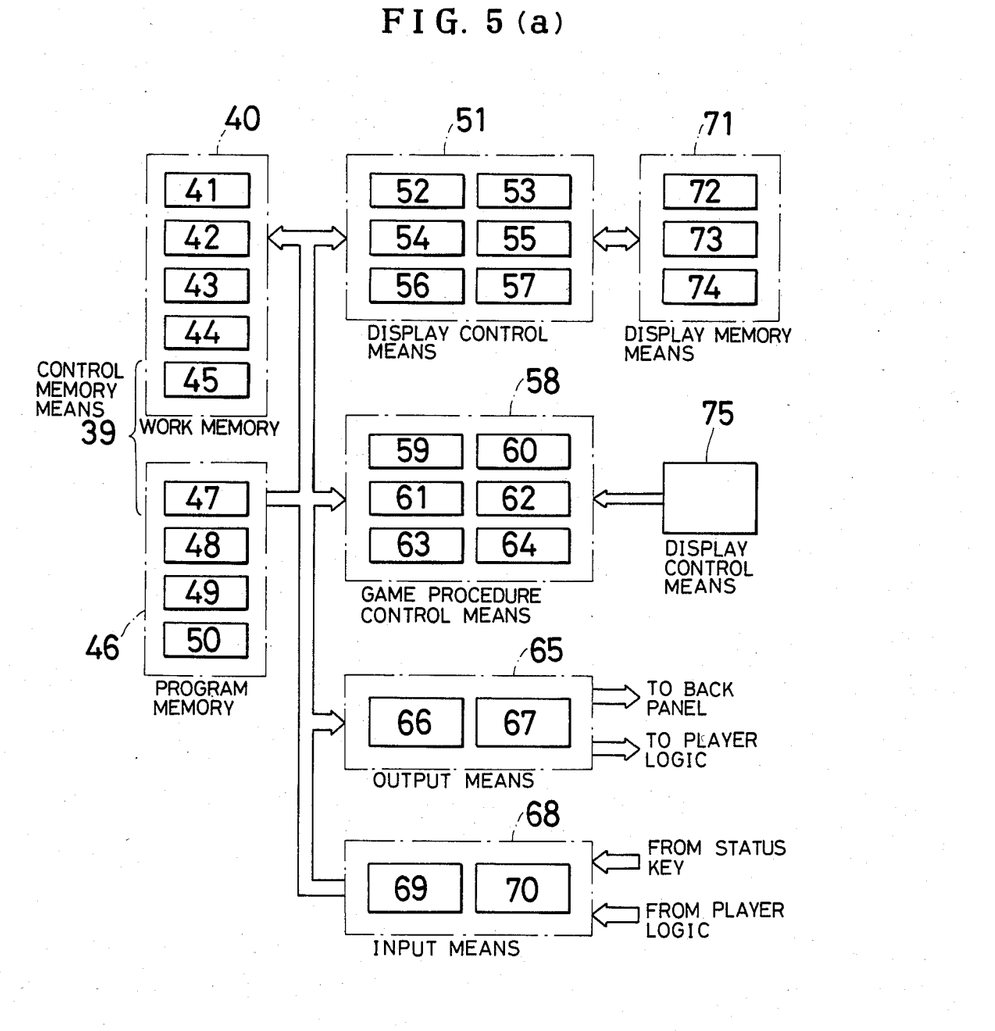
FIGS. 5(a) and 5(b) are block diagrams of circuits of a dealer machine and a player machine, respectively.
Figure 5B:
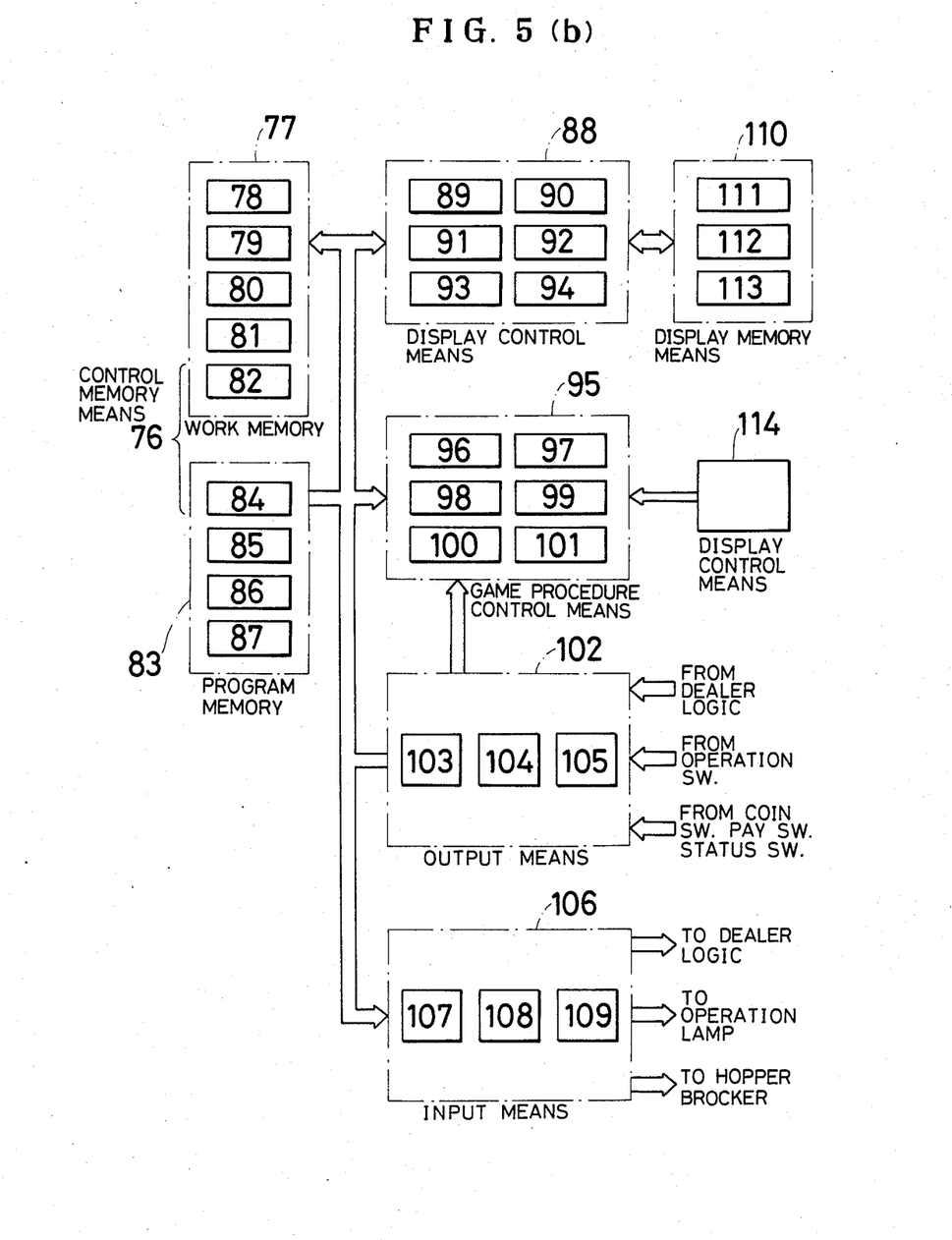

FIGS. 5(a) and 5(b) are block diagrams of circuits of the dealer machine and one of the player machines, respectively.
FIG. 5(a):
(i) Control Memory Means 39
  (A) Work Memory 40
    (1) Card Shuffle Information Unit 41
    (2) Hand Information Unit 42
    (3) Player Play Information Unit 43
    (4) Settlement Information Unit 44
    (5) Game Procedure Information Unit 45
  (B) Program Memory 46
    (1) System Control Information Unit 47
    (2) Game Procedure Control Information Unit 48
    (3) Display Control Information Unit 49
    (4) Picture Code Information Unit 50
(ii) Display Control Means 51 (=Dealer Data Processor 6)
  (1) Card Moving Means 52
  (2) Card Part-Overlapping Means 53
  (3) Arrow Flickering Means 54
  (4) Card Face Down To Up Means 55
  (5) Each-Card Display Means 56
  (6) Character Display Means 57
(iii) Game Procedure Control Means 58 (=Dealer Data Processor 6)
  (1) Ace Card Detection Means 59
  (2) Blackjack Detection Means 60
  (3) Player Input Time Counting Means 61
  (4) Player Information Detection Means 62
  (5) "17" Detection Means 63
  (6) Coin Counter Counting Means 64
(iv) Output Means 65
  (1) Dealer Information Output Means 66
  (2) Coin Counter Control Means 67
(v) Input Means 68
  (1) Player Information Input Means 69
  (2) Status Key Input Means 70
(vi) Display Memory Means 71
  (1) Character Code Video RAM 72
  (2) Color Code Video RAM 73
  (3) Character Generator ROM 74
(vii) Display Control Means (Video Counter) 75
FIG. 5(b):
(i) Control Memory Means 76
  (A) Work Memory 77
    (1) Total Data Information Unit 78
    (2) Hysteresis Data Information Unit 79
    (3) Dealer Information Unit 80
    (4) Hand Information Unit 81
    (5) "Credit" and "Bet" Coin Data Information Unit 82
  (B) Program Memory 83
    (1) System Control Information Unit 84
    (2) Game Procedure Control Information Unit 85

(3) Picture Control Information Unit 86
(4) Picture Code Information Unit 87
(ii) Display Control Means 88 (=Player Data Processor 30)
(1) Character Display Means 89
(2) Card Part-Shifting Means 90
(3) "Twin" Dividing Means 91
(4) Hysteresis Data Means 92
(5) Each-Card Display Means 93
(6) Card Face Down To Up Means 94
(iii) Game Procedure Control Means 95 (=Player Data Processor 30)
(1) Card-Sum Calculation Means 96
(2) "Bust" Detection Means 97
(3) "Pair-Card" Discrimination Means 98
(4) "Double Down" Detect Means 99
(5) Win Detection Means 100
(6) Settlement Means 101
(iv) Input Means 102
(1) Dealer Information Input Means 103
(2) Key Input Means 104
(3) Status Key/Coin Payment Input Means 105
(v) Output Means 106
(1) Player Information Output Means 107
(2) Key Lamp Output Means 108
(3) Hopper/Blocker Output Means 109
(vi) Display Memory Means 110
(1) Character Code Video RAM 111
(2) Color Code Video RAM 112
(3) Character Generator ROM 113
(vii) Display Control Means (Video Counter) 114

While only certain embodiments of the present invention have been described, it will be apparent to those skilled in the art that various changes and modifications may be made therein without departing from the spirit and scope of the invention as claimed.

What is claimed is:

1. An electronic game machine comprising:
   dealer means for controlling operation of a chance card game, said dealer means including a first data processing unit, a first memory, a first display panel, and a first power source;
   a plurality of discrete player means, for allowing either automatic or user operated play between at least one of said discrete player means and said dealer means, each of said plurality of discrete player means being compatible to each other and including a second data processing unit, a second memory, a second panel display, a second power source, a manual control unit, and a handling unit;
   means for indicating to each of said plurality of discrete player means the direction in which said dealer means is distributing the cards among the plurality of discrete player means;
   display control means for selectively displaying cards from said dealer means in either a face-up or face-down orientation in each of said plurality of discrete player means; and
   game condition detection means in said dealer means for calculating the results of game data stored in said first memory and for detecting current game conditions.

2. The machine as set forth in claim 1, wherein each of said plurality of player means is selectively operable in connection with said dealer means since each of said plurality of player means includes said second data processing unit, said second memory, and said second power source.

3. The machine as set forth in claim 1, further comprising a game hysteresis memory in each of said plurality of player means for storing hysteresis data such as the type and value of cards dealt during the course of the game.

4. The machine as set forth in claim 1, wherein said first data processing unit of said dealer means is responsive to the operation of said manual control unit in any selected one of said plurality of player means for providing game instruction information and sending it to said second data processing unit in said any selected one of said plurality of player means.

5. The machine as set forth in claim 1, wherein said first data processing unit of said dealer means is responsive to the detection of said second data processing unit in any one of said plurlaity of player means and receives game data from said second memory in any one of said plurality of player memories for calculation operations by said first data processing unit.

6. The machine as set forth in claim 1, wherein said second panel display in each one of said plurality of player means is for displaying game data dealt by said dealer means during the game.

7. The machine as set forth in claim 6, wherein said second data processing unit calculates the game data, and said second panel display is responsive to said second data processing unit for displaying the calculated results thereof.

8. The machine as set forth in claim 1, wherein said first panel display displays player identification information of each of said plurality of discrete player means with whom said dealer means is playing a game.

9. The machine as set forth in claim 1, wherein said first panel display is responsive to the detection of said game condition detection means for modifying the display format of the game data.

10. The machine as set forth in claim 1, wherein the chance game is blackjack.

11. The machine as set forth in claim 1, further including background music means for generating background music.

12. The machine as set forth in claim 1, further including payment asking means in each of said plurality of discrete player means for asking each of said player means to pay an amount calculated by said second data processing unit.

13. An electronic game machine comprising:
   a plurality of player machines;
   a single dealer machine having an individual display monitor, said single dealer machine arranged substantially in the center of said plurality of player machines and surrounded on the same level by said player machines;
   said individual display monitor of said single dealer machine being positioned with a tilt on a level lower than the level of display monitors of said plurality of player machines;
   said display monitor of said dealer machine displaying cards dealt to said plurality of player machines and displaying arrow symbols indicative of the card-dealt direction to each of said plurality of player machines;
   said display monitors of said plurality of player machines being responsive to the display of the arrow symbols for causing a display to be illuminated in said card-dealt player machine and the card to be then dealt.

14. The machine according to claim 13, wherein said dealer machine and said plurality of player machines are combined in a cabinet.

15. The machine according to claim 14, wherein each of said plurality of player machines and said dealer machine includes an independent control unit which is independently operated.

16. The machine according to claim 13, wherein each of said plurality of player machines are interchangeable so that said player machines can be replaced by similar machines in the event of a defect or failure therein.

* * * * *